United States Patent [19]

Gorbaty et al.

[11] 4,113,602
[45] Sep. 12, 1978

[54] INTEGRATED PROCESS FOR THE PRODUCTION OF HYDROCARBONS FROM COAL OR THE LIKE IN WHICH FINES FROM GASIFIER ARE COKED WITH HEAVY HYDROCARBON OIL

[75] Inventors: Martin L. Gorbaty, Fanwood, N.J.; Frank F. Tao; Peter S. Maa, both of Baytown, Tex.

[73] Assignee: Exxon Research & Engineering Co., Linden, N.J.

[21] Appl. No.: 693,830

[22] Filed: Jun. 8, 1976

[51] Int. Cl.² .......................... C10G 1/04; C10G 1/08; C10G 9/32
[52] U.S. Cl. ........................................ 208/8; 208/10; 208/127
[58] Field of Search ............... 208/8, 10, 127; 48/210, 48/197 R, 214; 201/21, 22, 24, 6, 8

[56] References Cited

U.S. PATENT DOCUMENTS

| | | | |
|---|---|---|---|
| 2,067,810 | 1/1937 | Angell | 208/8 |
| 2,664,390 | 12/1953 | Pevere et al. | 208/8 |
| 2,738,311 | 3/1956 | Frese et al. | 48/210 |
| 3,240,566 | 3/1966 | Bullough et al. | 208/8 |
| 3,617,513 | 11/1971 | Wilson et al. | 208/8 |
| 3,661,543 | 5/1972 | Saxton | 208/127 |
| 3,726,784 | 4/1973 | Correa et al. | 208/8 |
| 3,816,084 | 6/1974 | Moser et al. | 208/127 |
| 3,932,146 | 1/1976 | Wilson et al. | 48/210 |
| 3,966,585 | 6/1976 | Gray et al. | 208/8 |

*Primary Examiner*—Delbert E. Gantz
*Assistant Examiner*—Joan Thierstein
*Attorney, Agent, or Firm*—James E. Reed; Wayne Hoover

[57] ABSTRACT

Char fines produced by the gasification of coal or other carbonaceous solids are coked in the presence of heavy hydrocarbon oils, preferably 1000° F.+ bottoms products from a coal liquefaction process, to produce gaseous products, liquids, and larger coke particles. The coke particles thus produced may be fed to the gasifier for the production of additional gaseous products which can be used as fuel, employed as a source of hydrogen for coal liquefaction operations, or utilized for the production of hydrocarbon liquids.

12 Claims, 1 Drawing Figure

INTEGRATED PROCESS FOR THE PRODUCTION OF HYDROCARBONS FROM COAL OR THE LIKE IN WHICH FINES FROM GASIFIER ARE COKED WITH HEAVY HYDROCARBON OIL

BACKGROUND OF THE INVENTION

1. Field of the Invention

This invention relates to the production of hydrocarbons from coal and similar carbonaceous solids and is particularly concerned with processes for the gasification of coal and other carbonaceous solids in fluidized bed reactors.

2. Description of the Prior Art

The advantages of fluidized bed reactors for the gasification of coal and similar carbonaceous solids are well known. Such reactors permit the handling of large volumes of particulate solids on a continuous basis, are capable of accepting feed materials of relatively wide particle size distributions, permit high heat transfer rates, result in substantial temperature uniformity, facilitate the control of reaction conditions, and have other characteristics which generally make them superior to other systems. One disadvantage of such reactors, however, is that fine particles which are present in the feed material or are produced during the gasification reaction tend to be carried overhead with the raw product gas and must be removed prior to further treatment of the gas. This is normally done by first passing the gas stream through one or more cyclone separators or similar devices which remove the larger entrained particles and then scrubbing the gas to take out additional entrained fines.

Studies have shown that the char fines carried overhead with the product gas during fluidized bed coal gasification and similar operations represent a significant part of the total solids present in such systems and, depending upon the particular solid feed material and reactor conditions employed, may correspond to as much as 10 to 25 weight percent of the dry solids fed to the gasifier. These fines often contain from about 50 to 70 weight percent carbon and hence represent a significant loss of feed material. This is reflected by a corresponding reduction in the volume of product gas or the amount of energy recovered from the system. There have been numerous suggestions as to ways in which the fines might be used to reduce these losses. Recycling to the gasifier has been proposed but this is generally impractical. In most instances, the recycled fines tend to move upwardly through the fluidized bed at velocities approaching those of the fluidizing gas and are thus not retained in the bed long enough to permit their conversion. To avoid the continuous recycling and buildup of fine particles in the system, it is generally recommended that the fines be burned as an auxiliary fuel or otherwise utilized outside the gasifier. This reduces the overall efficiency of the process and has other disadvantages.

SUMMARY OF THE INVENTION

This invention provides an improved, integrated process which at least in part alleviates the difficulties outlined above. In accordance with the invention, it has now been found that problems due to the rapid passage of char fines upwardly through the fluidized bed during the fluidized bed gasification of coal and similar carbonaceous solids can be avoided by recovering char fines from the raw product gas taken overhead from the gasifier and then coking these fines and a heavy oil boiling in excess of about 1000° F., preferably a 1000° F.+ bottoms product from a coal liquefaction operation. The coke thus produced has a larger particle size than the fines and can be readily gasified to produce additional gaseous products, used as a source for granular activated carbon, or employed for other purposes. Studies have shown that the heavy oil acts as a binder or matrix for the fine char particles and permits the production of gaseous products, liquids, and coke particles of sufficient size to be subsequently gasified without difficulty. This results in a significant improvement in the overall efficiency of fluidized bed gasification operations, makes possible more effective carbon utilization than might otherwise be obtained, permits greater yields of useful gaseous and liquid products than are generally obtained from the available feedstocks, and has other advantages.

In a preferred embodiment of the invention, char fines recovered from a fluidized bed gasifier are blended with a heavy bottoms fraction produced by the liquefaction of coal or similar carbonaceous solids, the resulting mixture is fed to a fluidized bed or delayed coking unit for the production of gases, liquids of lower boiling point, and coke particles, and these coke particles are then introduced into the gasifier, alone or in combination with coal or similar carbonaceous solids, to produce hydrogen useful in the liquefaction operation and other gaseous products. This embodiment of the invention has particular advantages in that it alleviates sticking and agglomeration problems which may otherwise be encountered during the coking of liquefaction bottoms, permits the production of significantly greater yields of valuable gaseous and liquid products than are normally obtained in coal conversion processes, and substantially reduces the volume of solids which must be disposed of in connection with such conversion operations. As a result of these and other advantages over processes suggested in the prior art, the process of the invention has many potential applications.

DESCRIPTION OF THE PREFERRED EMBODIMENTS

Figure 1:
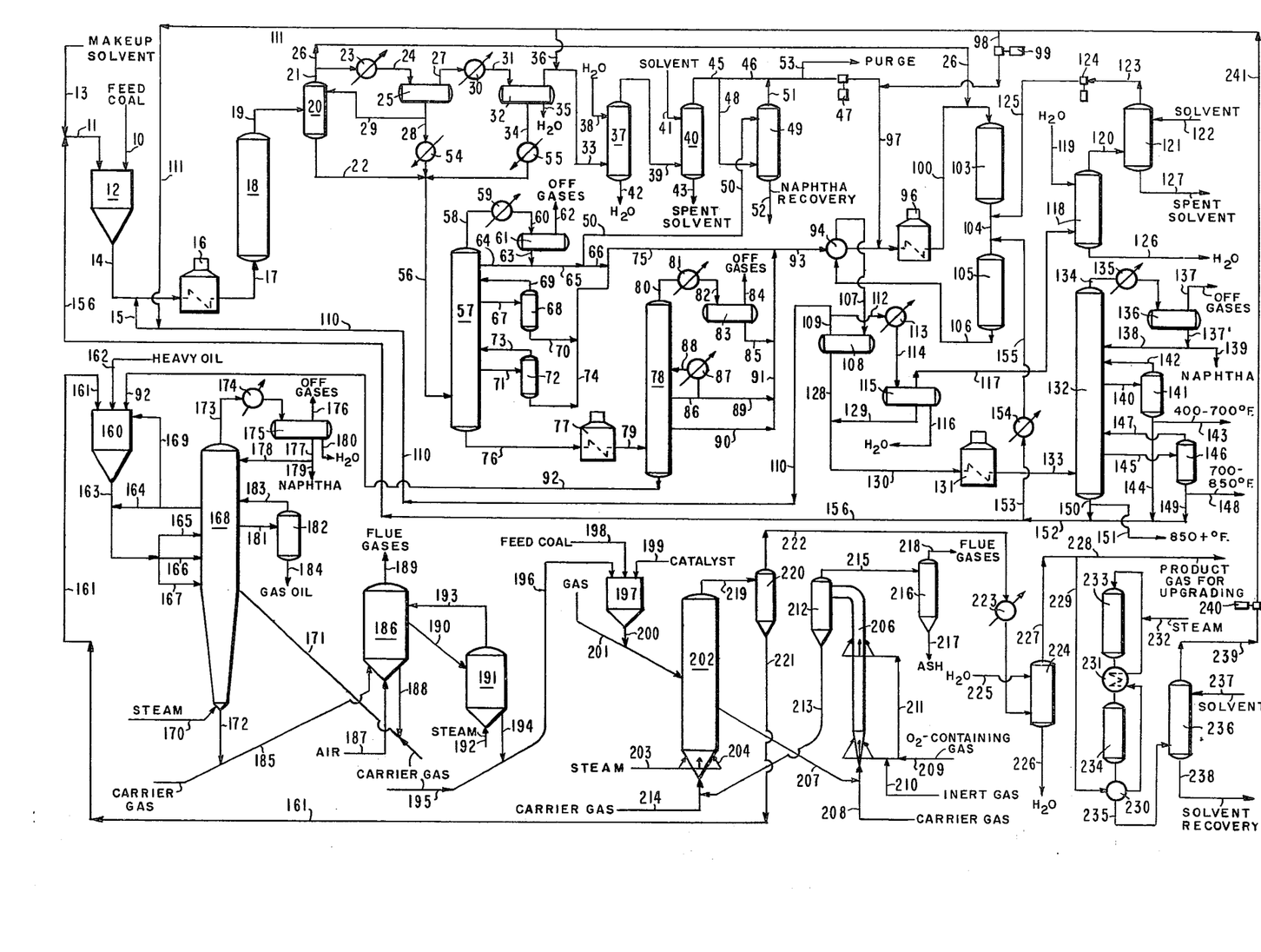
The drawing is a schematic flow diagram of an integrated process for the conversion of coal or similar carbonaceous solids into liquid and gaseous products in accordance with the invention.

The process depicted in the drawing is an integrated process for the production of liquids and gaseous products from bituminous coal, subbituminous coal, lignite, or the like in which the solid feed material is liquified to produce liquid products, gas and a heavy bottoms fraction boiling in excess of about 1000° F., this bottoms fraction is blended with char fines from a fluidized bed gasifier associated with the unit, the blended material is subsequently coked to form additional liquids and gaseous products and solid coke particles, and these coke particles are then at least in part gasified in the fluidized bed gasifier to form hydrogen for use in the liquefaction step of the process and gaseous products useful for other purposes. It will be understood that the process is not restricted to the particular type of liquefaction, gasification and coking units shown in the drawing and that other systems operating in similar fashion may be used.

In the process shown in the drawing, feed coal is introduced into the system through line 10 from a coal storage or feed preparation zone not shown in the drawing and combined with a hydrogen-donor solvent introduced though line 11 to form a slurry in slurry preparation zone 12. The feed coal employed will normally consist of solid particles of bituminous coal, subbituminous coal, lignite, or a mixture of two or more such materials having a particle size on the order of about one-fourth inch or smaller along the major dimensions. It is generally preferred to employ coal which has been crushed and screened to a particle size of about 8 mesh or smaller on the U.S. Sieve Series scale. The feed coal may be dried to remove excess water, either by conventional techniques before the solids are mixed with the solvent in the slurry preparation zone or by mixing the wet solids with hot solvent at a temperature above the boiling point of water, preferably between about 250° F. and about 350° F., to vaporize the water in that preparation zone. The moisture in the feed slurry will preferably be reduced to less than about 2 weight percent.

The hydrogen-donor solvent used in preparing the coal-solvent slurry will normally be a coal derived solvent, preferably a hydrogenated recycle solvent containing at least 20 weight percent of compounds which are recognized as hydrogen donors at elevated temperature of from about 300° to about 900° F. or higher. Solvents containing at least 50 weight percent of such compounds are preferred. Representative compounds of this type include indane, $C_{10}$–$C_{12}$ tetrahydronaphthalenes, $C_{12}$ and $C_{13}$ acenaphthenes, di-, tetra- and octahydroanthracenes, tetrahydroacenaphthenes, crysenes, phenanthrenes, pyrenes, and other derivatives of partially saturated aromatic compounds, Such solvents have been described in the literature and will be familiar to those skilled in the art. The solvent composition resulting from the hydrogenation of recycle solvent fractions will depend in part upon the particular coal used as the feedstock to the process, the process steps and operating conditions employed, and the conditions used in hydrogenating the solvent fraction selected for recycle following liquefaction. In the slurry preparation zone 12, the incoming feed coal is normally mixed with solvent in a solvent-to-coal ratio of from about 0.8:1 to about 2:1. The solvent employed on the initial startup of the process and any makeup solvent required can be added to the system through line 13.

The coal-solvent slurry prepared as described above is withdrawn from slurry preparation zone 12, passed through line 14 where it is mixed with vapor recycled through line 15, and introduced into mixed phase preheat furnace 16 where the feed materials are heated to a temperature within the range between about 750° F. and about 950° F. The mixture of hot slurry and recycle vapor withdrawn from the furnace through line 17 will normally contain from about 1 to about 8 weight percent, preferably from about 2 to about 5 weight percent, of hydrogen on a moisture and ash-free coal basis. This hot feed stream is then introduced into liquefaction reactor 18 which is maintained at a temperature between about 750° F. and about 950° F. and at a pressure between about 1000 psig and about 3000 psig, preferably between about 1500 and about 2500 psig. Although a single liquefaction reactor is shown in the drawing, a plurality of upflow or other type reactors arranged in parallel or series can also be employed. The liquid residence time within reactor 18 will normally range between about 5 minutes and 200 minutes, preferably between about 10 and about 60 minutes.

Within liquefaction zone 18, high molecular weight constituents of the feed coal are broken down and hydrogenated to form lower molecular weight gaseous and liquid products. The hydrogen-donor solvent contributes hydrogen atoms which react with organic radicals liberated from the coal and prevent their recombination. The hydrogen in the recycle vapor stream injected with the slurry serves as replacement hydrogen for depleted hydrogen-donor molelcules in the solvent and results in the formation of additional hydrogen-donor molecules by in situ hydrogenation. The process conditions within the liquefaction zone are selected to insure the generation of sufficient hydrogen-donor precursors and at the same time provide sufficient liquid product for proper operation of the solvent hydrogenation zone. These conditions may be varied as necessary.

A liquefaction reactor product stream including gaseous products such as carbon monoxide, carbon dioxide, ammonia, hydrogen, hydrogen sulfide, methane, ethane, ethylene, propane, propylene and the like, unreacted hydrogen from the feed slurry, solvent, and heavier liquefaction products is taken off overhead from the liquefaction reactor through line 19. This stream is passed to reactor effluent separator 20 where it is separated, preferably at substantially liquefaction reactor pressure and at a temperature only slightly lower than that in the liquefaction reactor, into an overhead vapor stream which is withdrawn through line 21 and a liquid stream taken off through line 22. The vapor stream may be passed through heat exchanger 23 and cooled to a temperature between about 400° and about 700° F. and then introduced through line 24 into hot liquefaction separator 25, still at substantially liquefaction pressure. Alternatively, the vapor stream from separator 20 may be taken overhead through line 26 for direct passage to the solvent hydrogenation step of the process as discussed hereafter.

The vapor stream introduced into separator 25 is separated into a stream of gases and vapors which are withdrawn through line 27 and a liquid stream taken off through line 28. A portion of this liquid stream may be recycled through line 29 to reactor effluent separator 20 if desired. The gases and vapors in line 27 pass through heat exchanger 30 where they are further cooled, preferably to substantially atmospheric temperature, without any substantial reduction in pressure. From the heat exchanger, the cooled gases and vapors flow through line 31 into cold liquefaction separator 32 where further separation takes place. An overhead stream containing hydrogen, carbon monoxide, carbon dioxide, ammonia, hydrogen sulfide, hydrogen chloride, normally gaseous hydrocarbons and some naphtha boiling range hydrocarbons is withdrawn through line 33. A liquid stream containing dissolved gases but composed primarily of hydrocarbons boiling below about 700° F. at atmospheric pressure is recovered through line 34. A sour water stream produced by the condensation of water vapor is withdrawn through line 35.

The gases and vapors recovered from the cold liquifaction separator are passed through line 33, together with makeup hydrogen added through line 36 if desired, into liquefaction water scrubber 37 where they are contacted with water added through line 38 for the removal of ammonia, hyrogen chloride, and other water-soluble constituents. The scrubber may be a conventional spray-type unit, a venturi scrubber or the like. The scrubber gas and vapors are then passed through line 39 to solvent scrubber 40 where they are contacted with monoethanolamine, diethanolamine, or a similar solvent introduced through line 41 for the removal of hydrogen sulfide, carbon dioxide and other acid gases. The spent scrubber water withdrawn from scrubber 37 through line 42 and the spent solvent withdrawn from the solvent scrubber through line 43 are passed to a solvent recovery unit not shown in the drawing for the removal and recovery of the adsorbed materials and regeneration of the solvent. The regeneration step is generally carried out by flashing and steam stripping but the particular method employed will depend upon the solvent selected, the contaminants present in the spent solvent stream, and other factors.

The gases and accompanying vapors from which ammonia and acid gases have been removed are taken overhead from the solvent scrubber through line 45. This stream may be passed by way of line 46 to solvent hydrogenation feed compressor 47. Alternatively, the gases and vapors may be directed through line 48 to naphtha scrubber 49 where they are contacted with naphtha introduced through line 50 for the removal of carbon monoxide, methane and higher hydrocarbons. This naphtha scrubbing step normally results in a treated gas stream containing from about 80 to 90 weight percent of hydrogen and permits the recovery of additional carbon monoxide, naphtha and light hydrocarbons as products. The treated gas is then passed through line 51 and the spent naphtha is withdrawn through line 52 for recovery. The gas or mixture of gas and vapors fed to the solvent hydrogenation compressor will normally include carbon monoxide and carbon dioxide not removed in the scrubbers. A portion of this gas or mixture will normally be purged through line 53 to prevent the buildup of these materials within the system.

The liquid stream withdrawn from reactor effluent separator 20 through line 22 is passed through a pressure letdown valve not shown in the drawing to reduce the pressure to about 100 psia or less. The liquids withdrawn from hot liquefaction separator 25 through line 28 and from cold liquefaction separator 32 through line 34 are passed through similar pressure letdown valves and then heated in exchanges 54 and 55 to temperature approaching that of the liquid in line 22. These hot liquid streams are then combined and fed through line 56 to atmospheric fractionation unit 57.

In the atmospheric fractionation unit, the feed is fractionated and an overhead fraction composed primarily of gases and naphtha constituents boiling up to about 400° F. is withdrawn overhead through line 58. This overhead fraction is cooled in exchanger 59 and passed via line 60 to distillate drum 61 where the gases are taken overhead through line 62. The liquids product from drum 61 is withdrawn through line 63 and may be recycled in part through line 64 to the upper part of the fractionating column as reflux. The remaining naphtha may be passed through line 65 to line 50 for use in the naphtha scrubbing unit. Alternatively, the naphtha can be passed through line 66 for use as feed to the solvent hydrogenation unit as described hereafter. One or more intermediate fractions boiling within the range between about 250° F. and about 700° F. is withdrawn from atmospheric fractionator 57 for use as feed to the solvent hydrogenation reactor employed in the process. It is generally preferred to recover a relatively light fraction composed primarily of constituents boiling below about 500° F. by means of line 67, stripper 68, reflux line 69, and line 70 and to recover a heavier intermediate fraction composed primarily of constituents boiling below about 700° F. by means of line 71, stripper 72, reflux line 73 and line 74. These two distillate fractions, plus a lower boiling overhead fraction if naphtha is not used to scrub the gases and vapors in scrubber 49, are passed through line 75 for use as liquid feed to the solvent hydrogenation unit. The bottoms fraction from the atmospheric column, composed primarily of constituents boiling in excess of about 700° F., is withdrawn through line 76, heated to a temperature of about 600° to 700° F. or the like in furnace 77 and introduced into vacuum fractionation unit 78 through line 79.

In the vacuum fractionation column, the feed is distilled under reduced pressure to permit the recovery of an overhead fraction which is withdrawn through line 80, cooled in exchanger 81 and then passed through line 82 into distillate drum 83. Gases and vapors are taken off through line 84 and liquids are withdrawn through line 85. This gas stream, and the gas stream from the atmospheric fractionator, can be employed as a fuel for generating process heat or used for other purposes. A heavier intermediate fraction, one composed primarily of constituents boiling below about 850° F. for example, may be recovered by means of line 86, heat exchanger 87, reflux line 88 and line 89. Still another, heavier sidestream may be withdrawn through line 90. These fractions are passed through line 91 and blended with the distillate fraction from the atmospheric column for use as feed to the solvent hydrogenation unit. A bottoms fraction boiling in excess of about 1000° F. and containing unreacted coal residues is withdrawn from the vacuum fractionation column through line 92 for use as feed to the coking or pyrolysis unit as described hereafter. A number of alternates to the fractionation step described above may be employed for purposes of the invention if desired. One such alternate, for example, is to pass the liquid stream from the reactor effluent separator and the liquefaction separators to a centrifuge, gravity settling unit, filter or the like for the removal of unreacted coal solids from the liquids prior to fractionation. Antisolvents such as hexane, decalin, or certain petroleum hydrocarbon liquids can be added to the liquefaction products to facilitate separation of the unreacted coal and ash from the liquids and permit their removal from the system. Processes of this type have been described in the literature and will be familiar to those skilled in the art. The liquids remaining following this solids separation step can then be separated by fractionation into a naphtha fraction which may be used in scrubber 49 or fed to the solvent hydrogenation unit, one or more intermediate streams to be fed to the solvent hydrogenation reactor, and a heavy bottoms fraction which can be employed as feed to the coking unit in accordance with the invention.

Another alternate procedure which is advantageous in some cases is to pass at least part of the liquid stream from the reactor effluent separator 20 and liquefaction separators 25 and 32 to the coking unit for upgrading of the liquids by thermal cracking and other reactions. The coking unit in this case will normally include a coker fractionation tower in which the vaporized products from the coker are distilled to produce an overhead gas stream, a naphtha stream which can be employed as the naphtha supplied to scrubber 49 if desired, various streams useful as feed to the solvent hydrogenation reactor and product oil, and a heavier bottoms product which can be recycled, with gasifier fines, to the coking unit. The coke produced in the coking unit can then be employed as feed to the gasifier for the production of hydrogen and other gaseous products. Still other modifications in the handling of the liquid products from the liquefaction reaction which may be employed for purposes of the invention will suggest themselves to those skilled in the art.

As indicated above, the liquid feed to the solvent hydrogenation reactor will normally include liquid hydrocarbons composed primarily of constituents in the 250° to 700° F. boiling range recovered from atmospheric fractionation unit 57 and a heavier stream in the 700° to 1000° F. range recovered from vacuum fractionation unit 78. It may also include liquid hydrocarbons of similar boiling range characteristics derived from the coking unit associated with the process. The liquid hydrocarbons from the atmospheric and vacuum fractionation units are combined in line 93, passed through heat exchanger 94 and introduced into solvent hydrogenation unit furnace 96. Gas or a mixture of gas and vapor from compressor 47 is passed through line 97 and mixed with the liquid feed before it is introduced into the furnace. Makeup hydrogen supplied through line 98 and compressor 99 may be included if desired. In the furnace, the combined feed is heated to the solvent hydrogenation temperature and then passed to the hydrogenation reactor through line 100. In lieu of or in addition to the gases or vapor introduced into the liquid feed, hot vapor withdrawn from the liquefaction effluent separator and passed through line 26 may be introduced with the liquid feed stream.

The solvent hydrogenation reactor shown in the drawing is a two-state downflow unit including an initial stage 103 connected by line 104 to a second state 105 but other types of reactors can be employed if desired. The hydrogenation reactor is preferably operated at a pressure somewhat higher than that in the liquefaction reactor and at a somewhat lower temperature than that in the liquefaction reactor, The temperature, pressure and space velocity employed in the reactor will depend to some extent on the character of the feed stream employed, the solvent used, and the hydrogenation conditions selected for the process. In general, however, temperatures within the range between about 550° F. and about 850° F., pressures between about 800 psig and about 3000 psig, and space velocities within the range between about 0.3 and about 3 pounds of feed/hour/pound of catalyst are preferred. Hydrogen treat rates within the range between about 1000 and about 12,000 standard cubic feet per barrel may be used. It is generally advantageous to maintain a mean hydrogenation temperature within the reactor between about 675° F. and about 750° F., a pressure between about 2000 and about 2500 psig, a liquid hourly space velocity between about 1 and about 2.5 pounds of feed/hour/pound of catalyst, and a hydrogen treat rate within the range between about 2000 and about 6000 standard cubic feet per barrel.

Any of a variety of conventional hydrotreating catalysts may be employed for purposes of the invention. Such catalysts typically comprises an alumina or silica alumina support carrying one or more iron group metals and one or more metals from Group VI-B of the Periodic Table in the form of an oxide or sulfide. Combinations of one or more Group VI-B metal oxide or sulfide are generally preferred. Representative metal combinations which may be employed in such catalysts include oxides and sulfides of cobalt-molybdenum, nickel-molybdenum-tungsten, cobalt-nickel-molybdenum, nickel-molybdenum, and the like. A suitable catalyst, for example, is a high metal content sulfided cobalt-molybdenum-alumina catalyst containing from about 1 to 10 weight percent of cobalt oxide and about 5 to 40 weight percent of molybdenum oxide, preferably from 2 to 5 weight percent of the cobalt oxide and from about 10 to 30 weight percent of the molybdenum oxide. Other metal oxides and sulfides in addition to those specifically referred to above, particularly the oxides of iron, nickel, chromium, tungsten and the like, can also be used. The preparation of such catalysts has been described in the literature and is well known in the art. Generally, the active metals are added to the relatively inert carrier by impregnation from aqueous solution and this is followed by drying and calcining to activate the catalyst. Carriers which may be employed include activated alumina, activated alumina-silica, zirconia, titania, bauxite, bentonite, montmorillonite, and mixtures of these and other materials. Numerous commercial hydrogenation catalysts are available from various catalyst manufacturers and can be used.

The hydrogenation reaction which takes place in reactor stages 103 and 105 is an exothermic reaction in which substantial quantities of heat are liberated. The temperature within the reactor is controlled to avoid overheating and runaway reaction or undue shortening of the catalyst life by controlling the feed temperature and by means of a liquid or gaseous quench stream introduced between two stages. The quantity of quench fluid injected into the system will depend in part upon the maximum temperature to which the catalyst is to be subjected, characteristics of the feed to the reactor, the type of quench used, and other factors. In general, it is preferred to monitor the reaction temperatures at various levels within each stage by means of thermocouples or the like and to regulate the amount of feed and quench admitted so that the temperature does not exceed a predetermined maximum for that level. By increasing the amount of feed through line 100 or the amount of quench added between stages whenever the temperature at the corresponding point in the reactor becomes too high, the overall reaction temperature can be maintained within predetermined bounds. If the hydrogenation reaction is to be carried out in the lower part of the preferred 550° F. to 850° F. range, as may be the case when coal liquids of relatively low specific gravity and low sulfur and nitrogen contents are being hydrogenated, a somewhat greater increase in temperature may be permissible than is the case where the hydrogenation reaction is to be carried out in the upper part of the 550° to 850° F. range. Operations of the latter type are frequently used for the hydrogenation of liquid products having high sulfur and nitrogen contents and relatively high specific gravities. The optimum temperature and other conditions for a particular feedstock and catalyst system can be readily determined.

The hydrogenated effluent from the second stage 105 of the reactor is withdrawn through line 106, passed in indirect heat exchange with the feed stream to the furnace in exchanger 94, and introduced through line 107 into high pressure liquid-gas separator 108 from which an overhead stream containing hydrogen gas is withdrawn through line 109. This gas stream is at least partially recycled through lines 110 and 15 together with makeup hydrogen admitted through line 111, for reinjection with the feed slurry into liquefaction reactor preheat furnace 16.

If a gas quench is to be used in the solvent hydrogenation reactor, a portion of the gas stream from line 109 is withdrawn through line 112, cooled in heat exchanger 113 to a temperature sufficiently low to condense steam present in the gas, and then passed through line 114 to separator 115, from which the condensate is withdrawn as sour water through line 116. The overhead fraction from the separator is passed through line 117 to water scrubber 118 where it is countercurrently contacted with water introduced through line 119 for the removal of ammonia, hydrogen chloride, and other water-soluble constituents. The scrubbed gas then passes through line 120 into solvent scrubber 121 and is contacted with diethanolamine or similar solvent admitted through line 122 for the removal of hydrogen sulfide, carbon dioxide and the like. The gas from which ammonia and acid gases have been removed is passed through line 123 and compressor 124, and then introduced through line 125 into line 104 between the two hydrogenation stages. The water and spent solvent from scrubbers 118 and 121 are withdrawn through lines 126 and 127 and passed to regeneration facilities not shown in the drawing for recovery of the solvent.

Liquid hydrocarbons are withdrawn from solvent hydrogenation separator 108 through line 128 and combined with liquids withdrawn from separator 115, if any, through line 129. The liquid stream is then passed through line 130 through final fractionator preheat furnace 131. As indicated above, the further hydrogenation step may be carried out with either a gaseous or a liquid quench. If a liquid quench is employed, separator 115 and the associated scrubbers are not normally used and hence the only liquid sent to the fractionator preheat furnace will be that withdrawn from the separator 108.

In the final fractionator 132, preheated feed introduced from the furnace through line 133 is fractionated to produce an overhead stream composed primarily of gases and naphtha boiling range hydrocarbons. This stream is taken overhead through line 134, cooled in exchanger 135, and introduced into distillate drum 136. The off gases from the drum withdrawn through line 137 will be composed primarily of hydrogen and normally gaseous hydrocarbons but will also include some liquid constituents in the naphtha boiling range. This stream can be used as a fuel or employed for other purposes. The liquid stream withdrawn from the drum through line 137 ' is composed primarily of naphtha boiling range material and will generally be recycled in part as reflux through line 138 and recovered in part as product naphtha through line 139. A stream of sour water will also normally be recovered from drum 136 through a water line not shown in the drawing.

One or more side streams boiling above the naphtha boiling range are recovered from fractionator 132. In the particular installation shown in the drawing, a first side stream composed primarily of hydrocarbons boiling up to about 700° F. is taken off through line 140 into stripper 141, the overhead fraction is returned as reflux through line 142, and the bottoms fraction is withdrawn through line 143 or recycled through the process through line 144. A second side stream composed primarily of hydrocarbons boiling below about 850° F. is withdrawn from the fractionator through line 145 into stripper 146, a portion is returned as reflux through line 147, and the bottoms fraction is withdrawn through line 148 or recycled through line 149. A bottoms fraction composed primarily of hydrocarbons boiling below about 1000° F. is withdrawn from the stripper through line 150 and withdrawn as product through line 151 or recycled with the product from lines 144 and 149 through line 152. If a liquid quench is used in the solvent hydrogenation step, a portion of the recycle stream is passed through line 153, heat exchanger 154 and lines 155 through line 104 between the two solvent hydrogenation stages. The remaining recycle liquid, or all of it if a gas quench is employed in the hydrogenation step, is passed by means of line 156 and line 11 to the feed preparation step of the process for use as makeup solvent. The relative amounts of liquid recycled as solvent and recovered will depend upon the characteristics of the feed coal employed, the operating conditions selected, and other factors, but in most cases substantial quantities of liquid product in addition to those produced in the coking unit are recovered.

The heavy bottoms product withdrawn from vacuum fractionation column 78 through line 92 is passed to coker feed preparation zone 160. This bottoms product, composed primarily of heavy highly aromatic hydrocarbons boiling above about 1000° F., unconverted coal particles from the liquefaction step, and ash particles, may constitute as much as 50 weight percent of the total product from the liquefaction step of the process. It is normally a solid at atmospheric temperature and is therefore handled at elevated temperature in order to maintain it in the liquid state. In some cases, however, it may be advantageous to solidify the bottoms product and later reheat the material before it is subsequently processed in accordance with the invention. In the coker feed preparation zone, the liquefaction bottoms is blended with char fines produced in the gasification stage of the process and introduced into the feed preparation zone through line 161. If desired, a heavy oil introduced through line 162 from an extraneous source or produced as liquefaction effluent separator bottoms or final fractionator bottoms in the liquefaction step of the process may be blended with the vacuum fractionator bottoms to facilitate their handling. This blending step may be carried out within the coker feed preparation zone 160 or may instead be done prior to introduction of the liquids into the feed preparation zone. The liquids and char fines are normally blended in a weight ratio of from about 0.1 to about 5 parts of bottoms per part of fines but ratios outside this range may in some cases be employed if desired. The optimum ratio for a particular system will depend in part upon the physical characteristics of the bottoms fraction and fine particles, the blending temperature, the coking conditions to be employed, and other factors. In general, the use of from about 0.5 to about 2 parts of bottoms per part of char fines is preferred. In lieu of mixing the fines and bottoms prior to their introduction into the coker as shown, it may in some cases be advantageous to introduce the two streams separately so that mixing will occur within the coker.

The hot slurry prepared in coker feed preparation zone 160 is withdrawn from the preparation zone through line 163, mixed with a high temperature bottoms stream recycled through line 164, and passed through injection lines 165, 166 and 167 into the reaction section of a fluidized bed coking unit 168. Alternatively, the high temperature bottoms stream can be injected directly into the feed preparation zone 160 through line 169. The coking unit includes a lower reaction section containing a fluidized bed of coke particles maintained in the fluidized state by means of steam introduced into the lower portion of the unit through line 170 and an upper fractionation section from which liquid and gaseous products produced as a result of the coking reaction are withdrawn. The unit will also normally include one or more internal cyclone separators or similar devices not shown in the drawing which serve to remove entrained particles from the upflowing gases and vapors and return them to the fluidized bed below. The bed temperature in the unit is normally maintained between about 1000° F. and about 1400° F. by means of hot char which is introduced into the upper part of the reaction section of the unit through riser 171. The pressure within the reaction section will normally range between about 10 and about 30 pounds per square inch guage but higher pressures can be employed if desired. The optimum conditions for use in the coking zone will depend in part upon the characteristics of the feed material employed and may be varied as necessary.

The slurry of heavy oil and char fines introduced into the reaction section of the coking unit is sprayed onto the surfaces of the coke particles in the fluidized bed and rapidly heated to bed temperatures. As the temperature increases, liquid constituents of the slurry are vaporized and the heavier portions undergo thermal cracking reactions to form lighter products and additional coke. Simultaneously, hydrocarbons present in the char fines are vaporized and liberated. Other reactions also take place. The vaporized products, unreacted steam and entrained solids move upwardly through the fluidized bed, pass through the cyclone separators or other devices where coke particles present in the fluid stream are rejected, and move into the fractionation section of the unit. The coke particles and any unreacted solids move downwardly in the fluidized bed and are eventually withdrawn from the bottom of reactor 168 through line 172. During the process, the average size of the coke particles increases as the particles move through the fluidized bed due to the formation of additional coke from the slurry liquids and solids.

In the fractionation section of the coking unit, the fluid stream passing overhead from the reaction section is cooled to condense out a heavy bottoms fraction boiling in excess of about 1000° F. and scrubbed to remove the remaining solids. The heavy bottoms product containing the solids thus removed is recycled through line 164 for reintroduction into the reactor with the slurry of heavy oil and char fines. As pointed out earlier, this heavy stream may instead be sent directly to the coker feed preparation zone if desired. This latter procedure has certain advantages in that it supplies additional heat to the feed preparation zone and may facilitate handling of the heavy vacuum bottoms fraction employed in the feed stream. In the upper part of the fractionation section, the lighter constituents of the reaction product stream are fractionated. Gases and naphtha boiling range constituents are taken overhead through line 173, passed through heat exchanger 174, and introduced into drum 175. Here the gaseous constituents are separated and taken overhead through line 176. This stream will normally contain hydrogen, carbon monoxide, carbon dioxide, and light hydrocarbons and may be employed as a fuel, used as a source of hydrogen for the liquefaction step of the process, or utilized for other purposes. The liquids separated in drum 175, composed primarily of naphtha boiling range hydrocarbons, are withdrawn through line 177. A portion of this stream is recycled to the fractionation section of the coking unit through line 178 and the rest is withdrawn through line 179 as product naphtha. A sour water stream is withdrawn through line 180. One or more intermediate side streams may also be recovered from the fractionation section of the unit. In the particular unit shown, a single stream is withdrawn through line 181 into stripper 182, the overhead is returned as reflux through line 183, and a liquid hydrocarbon stream boiling in the gas oil range is recovered through line 184. Although a single intermediate side stream is shown, two or more such streams will often be recovered. These streams constitute additional liquid products from the integrated process and may be employed for a variety of different purposes.

The coke withdrawn from the bottom of the reaction section of the coking unit through line 172 will generally pass through a slide valve or similar device not shown in the drawing which serves to control the height of the bed within the unit, normally between about 30 and about 50 feet. The bed velocity generally ranges from about 1 to about 3 feet per second and the reactor holding time is normally between about 10 and about 30 seconds. The downflowing coke particles in line 172 are entrained in steam or other carrier gas and carried upwardly through riser 185 into fluidized bed burner 186. Air or other oxygen-containing gas is introduced into the bottom of the burner through line 187 to aid in maintaining the coke particles in the fluidized state and provide the oxygen required for combustion of a portion of the coke. The burner temperature will normally be maintained within the range between about 1100° F. and about 1500° F. by regulating the amount of air admitted. The bed temperature should be from about 50° to about 300° F. in excess of that within the reaction section of the coking unit 168. The pressure within the burner will normally be similar to that in the reactor, between about 10 and about 30 pounds per square inch gauge. Hot coke particles are withdrawn from the burner through standpipe 188 and recycled by means of a stream of steam or other carrier gas to the reaction section through line 171. Hot combustion gases are taken overhead from the burner through line 189, subjected to conventional treatment for the recovery of heat and the removal of contaminants, and then may be discharged into the atmosphere. The burner will normally include one or more internal cyclone separators not shown in the drawing for the removal of coke particles from the upflowing gases before they leave the burner. The bed velocity within the burner will normally range between about 2 and about 3 feet per second and the depth of the bed is generally controlled at between about 10 and about 15 feet.

Hot char particles are continuously withdrawn from burner 186 through line 190 containing a slide valve or similar control means not shown in the drawing and pass into fluidized bed withdrawal vessel 191. The withdrawn particles are maintained in the fluidized state by means of steam or other fluidizing gas injected into the bottom of the vessel through line 192. An overhead stream of gas containing entrained coke particles is taken off through line 193 and returned to the fluidized bed within the burner. A stream of larger coke particles is withdrawn from vessel 191 through line 194 and entrained in a stream of steam or other carrier gas admitted into the system through line 195. The resulting stream of fluidized solids is then passed upwardly through riser 196 into gasifier feed hopper 197. The gasification step of the process will normally be carried out with both coke from the coking step and feed coal introduced into the gasifier separately or in combination with the coke particles. Coal particles crushed and screened to a size of about 8 mesh or smaller on the U.S. Sieve Series scale may be introduced into hopper 197 through line 198. Solid particles or an aqueous solution of potassium carbonate, potassium acetate, potassium formate, cesium carbonate, or a similar organic or inorganic alkali metal compound may be added to the solids in hopper 197 through line 199 to catalyze the gasification reaction. Studies have shown that the use of such an alkali metal compound accelerates the gasification reaction, lowers the temperature required for gasification purposes, and has other significant advantages.

Feed solids are discharged from hopper 197 through line 200 into a stream of steam or other carrier gas in line 201 and fed into gasifier 202 at an intermediate point within the fluidized bed maintained therein. Within the gasifier, the injected coal is devolatilized and hydrogasification reactions take place. The coke and resulting char particles react with steam introduced into the lower portion of the gasifier through line 203 and multiple injection nozzles 204. The steam maintains the carbonaceous solids within the gasifier in a fluidized bed and reacts with carbon in the solids to produce hydrogen, carbon monoxide, carbon dioxide, methane and some higher hydrocarbons. Depending upon the gasification products desired and whether an alkali metal catalyst is employed, the temperature within the gasifier may range from about 1000° F. to about 2000° F. or higher and the gasification pressure may be maintained between about 50 psig and about 2000 psig. Where it is desired to produce substantial quantities of methane and other hydrocarbons, gasification temperatures between about 1000° and about 1600° F. and pressure between about 500 and about 1500 psig are generally preferred. Where the principal product of the gasification reaction is to be a synthesis gas containing hydrogen and carbon monoxide, on the other hand, higher temperatures and lower pressures may be used. In either case, the use of an alkali metal catalyst in the gasification reaction is beneficial.

The gasification unit depicted in the drawing is one in which a transfer line burner 206 is used to supply a portion of the heat needed for the gasification reaction. In this system, hot coke or char particles are continuously withdrawn from the lower portion of the fluidized bed in gasifier 202 through line 207 and introduced to a stream of steam or other carrier gas which carries the carbonaceous particles upwardly through line 208 into the lower end of the burner. An oxygen-containing gas is introduced near the bottom of the burner through line 209 to aid in fluidizing the particles and initiate combustion. It is normally preferred to dilute the gas fed at the bottom of the burner with an inert gas introduced through line 210 so that the oxygen content of the gas injected at this point is less than about 15% by volume. Additional oxygen-containing gas, preferably air, is introduced into the burner at one or more levels along its length through line 211 to supply the additional oxygen required to support the combustion reaction. It is preferred that combustion within the burner be controlled so that the carbonaceous particles leaving the upper end of the unit have a temperature of from about 50° to about 300° F. higher than the temperature within the fluidized bed gasifier.

The hot particles leaving the upper part of the burner pass into cyclone separator 212 where the gases and entrained fines are separated from the larger coke or char particles. The solids removed from the gas stream pass downwardly through standpipe 213 and are returned to the gasifier by entraining them in a stream of carrier gas, steam preferably, introduced into the lower end of the gasifier through line 214. The gases taken overhead from separator 212 are passed through line 215 to cyclone separator or the like 216 where entrained solids too small to be removed in separator 212 are taken out of the gas stream. These solids, withdrawn through line 217, will consist primarily of ash and may be used for land fill purposes, employed for construction purposes, or utilized for other purposes. They may be treated if desired for the recovery of alkali metal constituents added as a catalyst. The flue gases taken overhead through line 218 are sent to downstream heat recovery and treating units for the elimination of contaminants prior to their discharge into the atmosphere.

In lieu of using a transfer line burner as described above, the heat needed for the gasification reaction can be supplied by means of a fluidized bed heater or other combustion vessel in which carbonaceous solids are burned and hot solids or combustion products are returned to the gasifier. In some cases, the necessary heat can also be generated by the introduction of air or oxygen into the gasifier to burn a portion of the carbonaceous material present in the fluidized bed. In still other instances, hot coke particles from the coke burner can be used to supply at least part of the heat required for gasification purposes.

The raw product gas generated by gasification of the coke or mixture of coal and coke in the fluidized bed of gasifier 202 is taken overhead from the gasifier through ine 219 and passed to cyclone separator or similar separation device 220. Fines contained in the gas, normally less than about 200 mesh on the U.S. Sieve Series scale in size, are removed from the gas stream and withdrawn from the separator through 221. Although a single separator is shown in the drawing, it will normally be advantageous to provide two or more separators in which fines of successively smaller sizes are removed from the gas stream. Scrubbers and other wet recovery systems can also be used. The fines thus recoverd are passed from line 221 through line 161 to coker feed preparation zone 160 for mixture with bottoms from the liquefaction step of the process of a similar heavy oil.

The gas from which the fines have been removed is recovered from the separator through line 222. The gas stream will generally contain hydrogen, carbon monoxide, carbon dioxide, methane, and may include other normally gaseous hydrocarbons. It will also usually include hydrogen sulfide, carbonyl sulfide, phenols, benzene and the like. The gas is passed through one or more heat exchangers 223 for the recovery of heat and then introduced into scrubber 224 where it is contacted with water introduced through line 225 for the removal of water soluble constituents in the gas. The water withdrawn through line 226 is passed to suitable water-treating facilities not shown in the drawing. The gas is withdrawn from the scrubber through line 227 and all or part of the gas may be passed through line 228 for the removal of contaminants and upgrading of the gas or used as a fuel or synthesis gas stream. It is generally preferred, however, to pass at least a part of the gas stream through line 229 and heat exchangers 230 and 231 into a catalytic water-gas shift unit where it is reacted with steam introduced through line 232 to convert carbon monoxide to carbon dioxide and generate additional hydrogen.

The shift unit shown in the drawing is a staged unit including a first stage 233 and a second stage 234 with cooling beween the stages to control the reaction temperature. Any of a variety of water-gas shift catalysts may be employed in the shift reactor but it is normally preferred to utilize an alkali metal catalyst containing cesium carbonate or a similar alkali metal compound or a mixture of such compounds. Such shift catalysts are generally effective at relatively low temperature, are relatively insensititve to sulfur compounds in the gas and have other advantages over other catalysts which have been used to promote the shift reaction. The shifted gas, now containing incresed quantities of hydrogen and carbon dioxide, is passed through line 235 to solvent scrubber 236 where it is contacted with diethanolamine or a similar solvent for removal of carbon dioxide and any other acid gases which may be present. The spent solvent is withdrawn through line 238 for recovery and regeneration of the solvent and the scrubbed gas is taken overhead through line 239.

The scrubbed gas will normally be raised to liquefaction pressure in compressor 240 and then recycled to the liquefaction process. A portion of the recycled gas may be passed through lines 241 and 111 for introduction into the solvent-coal slurry fed through the liquefaction preheat furnace 16 into liquefaction reaction 18. Additional gas may be introduced through line 36 into the gas recovered from the hot and cold liquefaction separators or passed through line 98 to compressor 99 for introduction into the feed stream to the solvent hydrogenation reactors. This use of the recycle gas eliminates the necessity for supplying makeup hydrogen to the liquefaction process from extraneous sources and has numerous other advantages.

As indicated above, at least part of the gas may be further processed to upgrade its methane content and permit its use as a high Btu synthetic fuel. It can also be employed for the synthesis of hydrocarbons by the Fischer-Tropsch processes or employed as a low Btu fuel without upgrading. In still other cases, methane can be recovered from the raw product gas and at least part of the remaining hydrogen and carbon monoxide can be recycled to the gasifier to suppress gas phase reactions which tend to produce additional hydrogen and carbon monoxide and thus promote the generation of more methane. Still other modifications of the process as shown in the drawing, including the use of a delayed or flash coker or a Flexicoking unit in place of the fluid coker shown and the use of other types of gasifiers in lieu of the particular unit depicted, will suggest themselves to those skilled in the art.

The advantages of the process of the invention are further illustrated by the results of tests in which samples of a heavy bottoms fraction produced by the liquefaction of coal in a hydrogen-donor solvent liquefaction process similar to that depicted in the drawing and mixtures of the liquefaction bottoms with char fines recovered from the product gas generated in a fluidized bed gasifier of the same general type as that shown in the drawing were pyrolyzed to produce gaseous products, liquids, and coke or char. The liquefaction bottoms used, about 88% of which boiled in excess of 1000° F. at atmospheric pressure, was recovered from the liquefaction unit, solidified, and then crushed to a particle size less than 100 mesh on the U.S. Sieve Series scale. The gasifier fines had an average particle size less than 200 mesh. The tests were carried out in a bench scale reactor of the free-fall type. The reactor wall temperatures were maintained at 1600° F. by means of electric heaters associated with the unit. In the tests, 100 g. feed samples were fed from the top of the reactor with a concurrent flow of nitrogen preheated to 1000° F. to purge volatiles from the system and permit their recovery. Solids were collected at the bottom of the reactor and weighed following each run. The volatiles produced during each run were passed through a hot cyclone separator to remove entrained solids and then separated into liquid and gaseous constituents. Because of the techniques and equipment employed, the volatile material could not be completely recovered.

The pyrolysis of a mixture of equal parts by weight of the liquefaction bottoms and gasifier fines as described above resulted in the recovery from the bottom of the reactor of a relatively uniform finely divided product which was substantially free of aggregates and of solids of smaller particle size from the cyclone. Screen analyses of the mixed feed and the solid products obtained in this test are set forth in Table I below.

TABLE I

Size Distribution of Feed Sample and Char From Free-Fall Reactor Test

Feed - 1/1 mixture of liquefaction bottoms and gasifier fines.
% Cumulative on Screen

| Mesh | Feed | Char Reactor | Char Cyclone | Char Composite* |
|---|---|---|---|---|
| 10 | 0 | 0.58 | 0 | 0.42 |
| 20 | 0 | 1.89 | 0.47 | 1.51 |
| 30 | 0 | 4.95 | 0.94 | 3.87 |
| 48 | 0.07 | — | — | — |
| 50 | — | 41.73 | 4.28 | 31.62 |
| 100 | 0.68 | 81.73 | 26.76 | 66.89 |
| 150 | 18.50 | — | — | — |
| 200 | 39.62 | 94.43 | 49.72 | 82.36 |
| 325 | 82.02 | 98.95 | 87.04 | 95.73 |
| pass 325 | 17.98 | 1.05 | 12.96 | 4.27 |

*Based on recovered char from reactor (73%) and cyclone (27%).

It can be seen from the above table that the average particle size increased significantly during pyrolysis. Virtually all of the feed material was less than 100 mesh in size and about 18% of the feed had a particle size less than 325 mesh; whereas about 67% of the recovered solids were greater than 100 mesh and only about 4% were smaller than 325 mesh. It should also be noted that all of the particles recovered were relatively small and that no larger aggregates which might pose operating problems were produced. The gasifier fines apparently acted as an absorbent for the liquefaction bottoms in its thermoplastic state and prevented agglomeration. At the same time, the bottoms apparently acted as a binding agent for the gasifier fines and resulted in the production of particles sufficiently large to permit their gasification in a fluidized bed without the difficulties which are normally encountered when the fines themselves are injected directly into such a bed.

The product yields from the pyrolysis of equal parts of the liquefaction bottoms and gasifier fines as described above were determined from analyses of the char and gas samples. As pointed out earlier, all of the products of pyrolysis were not fully recovered and hence more direct methods could not be employed. The char yield was estimated as 77%, based on the elemental analyses of the feed and char as shown in Table II below.

TABLE II

Analyses of Feed Sample and Char From Free-Fall Reactor Test

Feed - 1/1 mixture of liquefaction bottoms and gasifier fines.

|  | Feed | Char Reactor | Char Cyclone | Char Composite* |
|---|---|---|---|---|
| % C | 72.90 | 68.08 | 70.98 | 68.86 |
| % H | 2.44 | 1.68 | 1.07 | 1.52 |
| Ash | 20.22 | 26.94 | 24.75 | 26.35 |
| H/C | 0.40 | 0.30 | 0.18 | 0.26 |
| Bulk Density, gm/cc | 0.84 | 0.32 | 0.32 | 0.32 |

% Char Yield = $\frac{20.22}{26.35} \times 100\% = 76.7\%$

*Based on recovered char from reactor (73%) and cyclone (27%).

The gas yield obtained was estimated to be 6%, based on the total volume and analyses of the gases as shown in Table III below.

TABLE III

Analysis of Gas Sample from Free-Fall Reactor Test

Feed - 1/1 mixture of liquefaction bottoms and gasifier fines.

Gas sample — 6 SCF/50 gm feed = 13.3 gm mole/100 gm feed.

|  | Vol. % | Vol. % ($N_2$ free) | gm/100 gm feed | Wt. % |
|---|---|---|---|---|
| $H_2$ | 1.08 | 37.9 | 0.28 | 4.9 |
| $CH_4$ | 1.03 | 36.1 | 2.18 | 38.5 |
| CO | 0.42 | 14.7 | 1.56 | 27.6 |
| $CO_2$ | 0.14 | 4.9 | 0.82 | 14.5 |
| $C_2H_6$ | 0.15 | 5.3 | 0.60 | 10.6 |
| $C_3H_8$ | 0.01 | 0.4 | 0.06 | 1.1 |
| $C_4H_{10}$ | 0.02 | 0.7 | 0.16 | 2.8 |
| $N_2$ | 97.15 | — | — | — |
|  | 100.00 | 100.0 | 5.66 | 100.0 |

Based on the values set forth in Tables II and III, the liquid yield obtained with equal parts by weight of liquefaction bottoms and gasifier fines was 17% by difference. The sample of gasifier fines was analyzed by thermogravimetric analysis and found to contain 15% by weight of volatile matter. Assuming that the gasifier fines were devolatized completely during pyrolysis and gave the same proportion of gas and liquid yield as the liquefaction bottoms, the product yield from each component of the feed mixture can be calculated to be as follows:

TABLE IV

Product Yields from Mixed Feed to Pyrolysis Step

| % Yield | From Gasifier Fines Alone | From Liquefaction Bottoms Alone | From 1/1 Mixture (Average) |
|---|---|---|---|
| Char | 85 | 69 | 77 |
| Gas | 4 | 8 | 6 |
| Liquid | 11 | 23 | 17 |

It can be seen from the data set forth above that pyrolysis of the mixed liquefaction bottoms and gasifier fines results in a substantial yield of liquid and gaseous products. The liquids and gases recovered from the fines represent an increase in recovery over that normally obtained in fluidized bed gasification operations requiring the discharge of fines to prevent their buildup and accumulation in the system. The result is thus greater overall efficiency and better carbon utilization than might otherwise be obtained.

Runs similar to that described above but carried out with liquefaction bottoms and without fines showed that the bottoms tended to form large aggregates which might pose serious operating problems.

The beneficial effects of using a mixture of liquefaction bottoms and gasifier fines during the coking step are further illustrated by the results obtained in tubing bomb tests. These tests were carried out by charging 10 gm. of a feed sample in an enclosed tubing bomb which was heated to 800° F. in a fluidized sand bath. The total heating period was 20 minutes with oscillating agitation of about 150 to 170 cycles per minute. The feed samples tested were mixtures of liquefaction bottoms crushed to −100 mesh size and gasifier fines in ratios of 0.5:1 to 3:1 parts by weight of bottoms to fines. It was found that the samples prepared from 0.5 parts of bottoms per part of fines and from equal parts of the bottoms and fines resulted in products which were noncaking and consisted for the most part of particles greater than 325 mesh in size. The feed samples prepared with greater amounts of the bottoms tended to produce tar products which exhibited caking properties. In general, the tendency toward caking increased with increasing amounts of the liquefaction bottoms. Screen analyses of the char products obtained in the tubing bomb tests with the feed samples containing equal parts of the liquefaction bottoms and gasifier fines and twice as much of the bottoms as fines are set forth in Table V.

TABLE V

Screen Analysis of Char Products from Tubing Bomb Tests

Feed Samples (−100 Mesh) - 1/1 and 1/2 mixtures of liquefaction bottoms and gasifier fines.

% Cumulative on Screen

| Mesh | Char from Feed of 1/2 Mixture | Char from Feed of 1/1 Mixture |
|---|---|---|
| 100 | 31.17 | 58.62 |
| 150 | 52.34 | 74.39 |
| 200 | 67.86 | 84.45 |
| 325 | 85.70 | 94.87 |
| pass 325 | 14.30 | 5.13 |

The results set forth in the foregoing tables illustrate that the gasifier fines counteract the tendency of the liquefaction bottoms to cake or agglomerate during pyrolysis and thus facilitate use of the bottoms as feed to a coking or similar pyrolysis operation. It is particularly advantageous to employ mixtures of the bottoms and fines in ratios of from about 0.5:1 to about 2:1 but under the proper pyrolysis conditions, mixtures falling outside this range can also be employed.

Although the process of the invention has been described above primarily in terms of the use of heavy liquefaction bottoms, it will be understood, as pointed out earlier, that other heavy oils boiling in excess of about 1000° F. can also be used. Such oils include, for example, heavy petroleum residua, asphalts and the like. Similarly, the process is not restricted to fines produced during coal gasification operations and instead is also applicable to fine particles produced during the gasification of petroleum coke and other carbonaceous solids.

We claim:

1. In a process wherein carbonaceous solids are gasified in a fluidized bed gasifier to produce a raw product gas and solid fines are carried overhead from said fluidized bed gasifier with said gas and separated from the gas, the improvement which comprises blending the separated fines with from about 0.1 to about 5 parts by weight per part of said fines of a heavy hydrocarbon oil boiling above about 1000° F., coking the resulting blend at atmospheric pressure and recovering coke particles having an average particle size substantially greater than that of said fines.

2. A process as defined by claim 1 wherein said heavy oil is a bottoms product derived by the liquefaction of coal.

3. A process as defined by the claim 1 including the further step of feeding said coke particles to said gasifier for the production of additional gaseous products.

4. A process as defined by claim 1 wherein said carbonaceous solids comprise coal.

5. A process as defined by claim 1 wherein said fines are coked in the presence of from about 0.5 to about 2 parts of said oil per part of said fines.

6. In an integrated process for the production of hydrocarbons from coal wherein feed coal particles are reacted with hydrogen in the presence of a hydrocarbon solvent to produce coal liquids and a heavy bottoms fraction boiling in excess of about 1000° F. is separated from said coal liquids and wherein said hydrogen is generated at least in part by the gasification of carbonaceous solids in a fluidized bed gasifier to produce a hydrogen-containing gas and entrained carbonaceous solid fines are separated from said gas downstream of said gasifier, the improvement which comprises introducing said heavy bottoms fraction and said carbonaceous solid fines into a coking zone in a ratio of from about 0.1 to about 5.0 parts by weight of said bottoms fraction per part of said fines and coking said bottoms fraction and said fines to produce gaseous products, liquids and coke particles having an average particle size greater than the average particle size of said carbonaceous solid fines.

7. A process as defined by claim 6 wherein said carbonaceous solids comprise coal particles.

8. A process as defined by claim 6 wherein said coke particles are withdrawn from said coking zone and fed to said fluidized bed gasifier.

9. A process as defined by claim 6 wherein said carbonaceous solid fines have an average particle size less than about 200 mesh on the U.S. Sieve Series scale.

10. A process as defined by claim 6 wherein said carbonaceous solid fines and said bottoms fraction are mixed and therafter introduced into said coking zone.

11. A process as defined by claim 8 wherein said coke particles are treated with a solution of an alkali metal compound before said particles are fed to said gasifier.

12. A process as defined by claim 10 wherein said fines and said bottoms fraction are mixed in a ratio of from about 0.5 to about 2.0 parts by weight of said bottoms fraction per part of said fines.

* * * * *